United States Patent [19]
Potter

[11] Patent Number: 6,012,732
[45] Date of Patent: Jan. 11, 2000

[54] COMBINATION EXERCISE AND LAND TRAVEL DEVICE

[76] Inventor: Steven Potter, 520 Indian Grove, Toronto, Ontario, Canada, M6P 2J2

[21] Appl. No.: 08/984,018

[22] Filed: Dec. 3, 1997

[51] Int. Cl.[7] .................................................. B60M 1/12
[52] U.S. Cl. .......................... 280/232; 280/230; 280/231; 280/282
[58] Field of Search .................... 280/230, 231, 280/232, 233, 243, 244, 251, 282

[56] References Cited

U.S. PATENT DOCUMENTS

| | | | |
|---|---|---|---|
| 3,760,905 | 9/1973 | Dower | 185/2 |
| 4,632,414 | 12/1986 | Ellefson | 280/246 |
| 4,639,007 | 1/1987 | Lawrence | 280/234 |
| 4,976,451 | 12/1990 | Kamenov | 280/226.1 |
| 5,690,346 | 11/1997 | Keskitalo | 280/234 |
| 5,775,708 | 7/1998 | Heath | 280/234 |
| 5,826,897 | 10/1998 | Beard | 280/250.1 |

FOREIGN PATENT DOCUMENTS 452567  8/1936  Canada ................................. 280/232

*Primary Examiner*—Robert J. Oberleitner
*Assistant Examiner*—Daniel Yeagley

[57] ABSTRACT

A combination exercise and land travel device includes a forwardly facing pedalling station from which a first operator propels the device and a steering control at the pedalling station. The device further includes a rowing station usable by a second operator to provide further propulsion for the device in addition to that provided at the pedalling station.

2 Claims, 2 Drawing Sheets

COMBINATION EXERCISE AND LAND TRAVEL DEVICE

FIELD OF THE INVENTION

The present invention relates to a combination exercise and land travelling device having both pedalling and rowing features.

BACKGROUND OF THE INVENTION

It is well known that rowing is a particularly good form of exercise. Land travel devices have been developed to be operated by a rowing motion. By way of example only, one such device is shown in U.S. Pat. No. 4,941,673, issued Jul. 17, 1990.

The difficulty encountered with a land travel rowing device such as that shown in the '673 patent is that, although possible, it is difficult to use one's arms to both row and steer at the same time.

SUMMARY OF THE INVENTION

The present invention provides a combination exercise and land travel device which incorporates rowing features without having to be steered by the person rowing on the device. More particularly, the present invention provides a combination exercise and land travel device having a forwardly facing pedalling station from which a first operator propels the device, steering means positioned to be controlled from the pedalling station and a rowing station usable by a second operator to provide propulsion for the device in addition to that provided at the pedalling station.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 2:
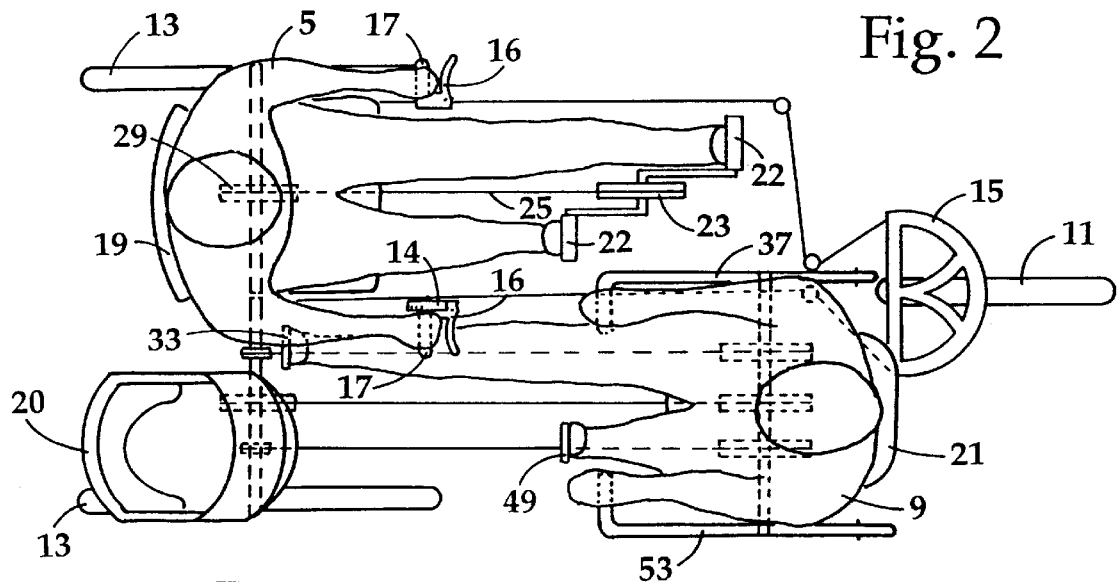
FIG. 2 is a top view of the device shown in FIG. 1.
Figure 1:
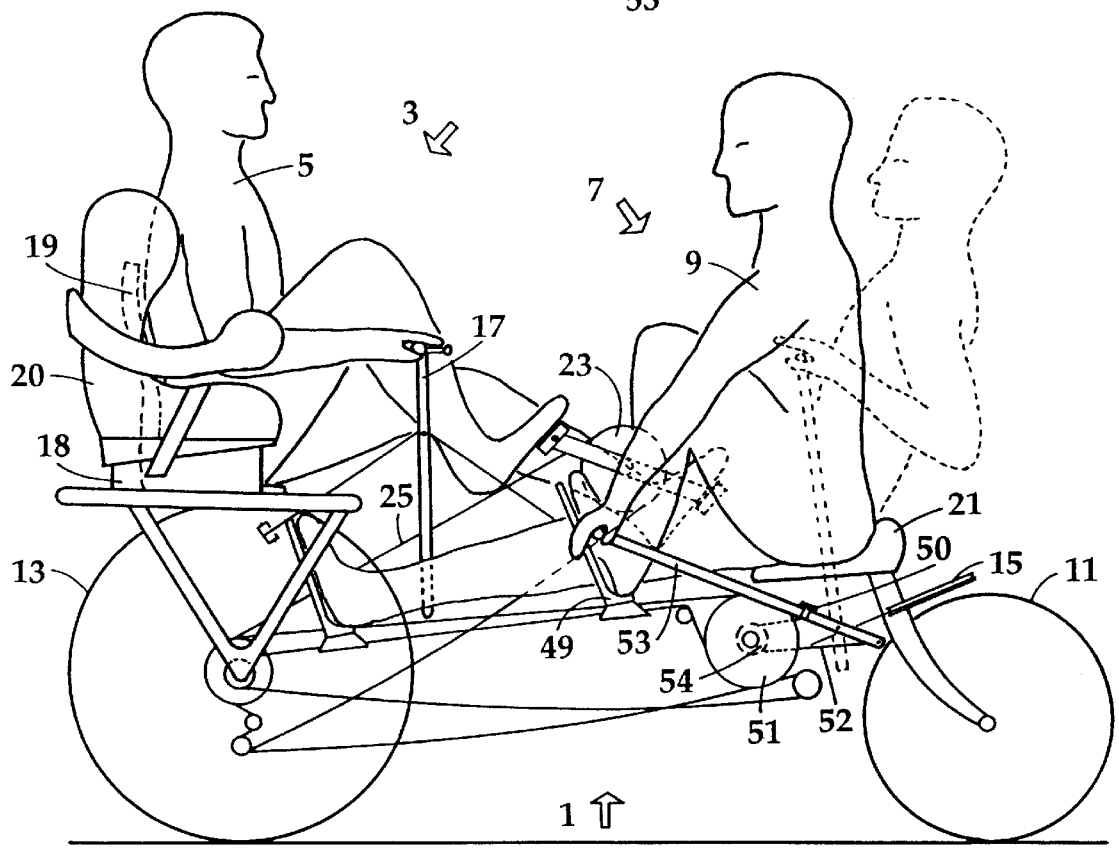
FIG. 1 is a side view of a combination exercise and land travel device according to a preferred embodiment of the present invention.

FIG. 1 shows a combination exercise and land travel device 1 comprising a pedalling station generally indicated at 3 and a rowing station generally indicated at 7. A first operator 5 supported in a seat 19 sits in a forwardly facing position at the pedalling station. A second operator 9 supported by a seat 21 faces rearwardly at the rowing station. As will be seen in FIG. 1, seat 19 is elevated relative to the seat 21 such that the first operator 5 is able to look over the second operator 9 to see what is in front of the device. The combination of the two operators provides essentially a full surround view from the device, providing a greater degree of safety as compared to conventional bicycles.

A removable mounting bracket 18 is provided to the right side of the pedalling station for the attachment of a child's seat 20.

The device has a central front wheel 11 and a pair of rear wheels 13. A steering member 15 for front wheel 11 is operated by a cable and pulley arrangement through hand controls 17 positioned to be held by operator 5 in the forwardly facing pedalling station.

Controls for braking 16 are attached to the steering controls 17 and connected to braking devices on all wheels. The right hand steering control also provides a gear selection device 14 connected to the derailleur gear 29.

The device can be operated solely from the pedalling station or with cooperation from the rowing station. The pedalling station itself comprises foot pedals 22 which are used to rotate a gear 23. This gear operates a chain 25 which in turn rotates a gear 29 at the rear of the device. Gear 29 is preferably a derailleur gear which allows gear changes as found on many of today's modern bicycles.

Figures 4, 5:
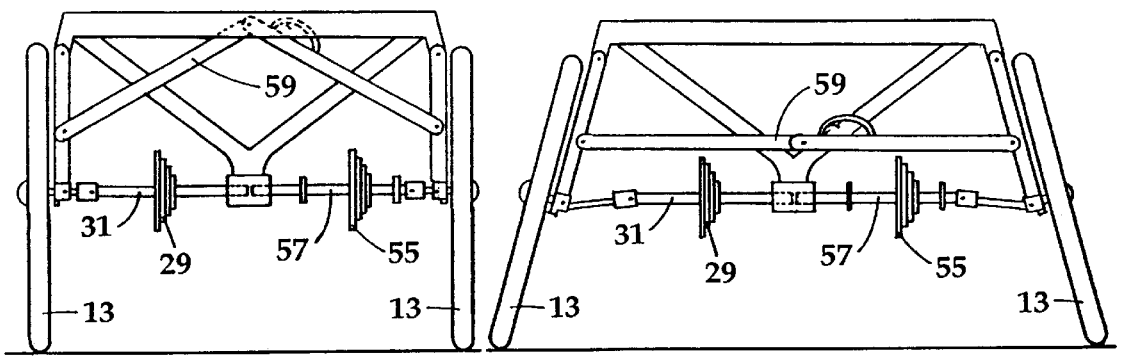
FIG. 4 is a rear view of the rear axle region of the device of FIGS. 1 and 2.
FIG. 5 is a rear view of the basic frame of the device of FIGS. 1 and 2 in a storage position.

As best seen in FIG. 4 of the drawings, the rear axle of the device which provides rotation of the two rear wheels is a split axle comprising first and second axle portions 31 and 57 respectively. These two axle portions are independent of one another such that axle portion 31 is driven strictly by gear 29 from the pedalling station.

The second axle part 57 of the rear axle is driven by a second derailleur gear 55. This derailleur gear is operated from the rowing station.

Figure 3:
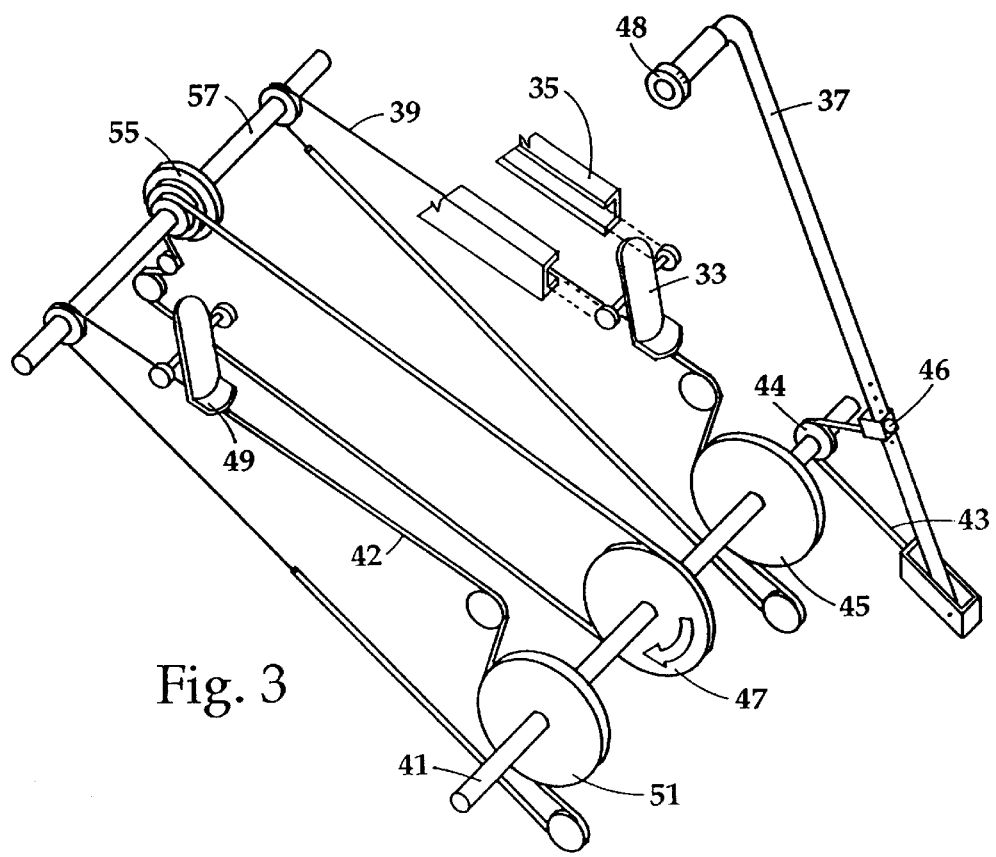
FIG. 3 is an exploded perspective view of portions of the rowing station from the device of FIGS. 1 and 2.

The rowing station itself is best seen having reference to FIG. 3 of the drawings. It should be noted that the track for the left pedal and a left oar are both omitted from FIG. 3.

The right side of the rowing station comprises a first pedal 33 which is leg operated along a track 35. This pedal is attached to a combination chain and cable 39 which wraps around a drive member 45 attached by a one way clutch mechanism to a front axle 41 of the rowing station. A main drive 47 is rotatably coupled to shaft 41 which provides the drive back to derailleur gear 55.

The right side of the rowing station further includes a first oar 37 which is connected through a linkage 43 to a second drive member 44 to assist rotating of the main drive gear 47.

Drive member 44 is attached to shaft 41 by a one way clutch mechanism in order that the first oar 37 and first pedal 33 may be operated independently of each other. The first oar 37 also includes an adjustment mechanism 46 to provide the second operator 9 a means of varying the amount of effort required to operate the oar. A gear selection mechanism 48 connected to the derailleur gear 55 is provided on the grip of the first oar 37.

The left side of the rowing station includes a leg operated pedal 49 which connects through a combination chain and cable 42 to a third drive member 51 again secured to shaft 41 by a one way clutch. As seen in FIG. 1 of the drawings, a second oar 53 is also provided on the left hand side of the rowing station with chain linkage 52 to a fourth drive member 54 which is secured to shaft 41 by a one way clutch mechanism. The second oar 53 includes an adjustment mechanism 50 similar to that on the first oar, allowing the second operator to vary the amount of effort required to operate the oar.

By way of the one way clutch connections on each of the four drive members 44, 45, 51 and 54 to shaft 41, this forward shaft and its main drive member 47 can be operated solely from one side of the rowing station while the other side of the rowing station is at rest or moved in the opposite direction. Additionally, the oars may be operated independently of the pedals or in any number of various, combined or reciprocating combinations. This provides a much greater variety of exercise than can be obtained from conventional rowing devices. This also allows a continuous drive on the rear axle part 57, which is helpful when traveling uphill, but has not been provided for in previous land travel devices propelled by rowing.

It will now be understood how the device can be propelled either solely from the pedalling station where the operators hands are free to steer the device or from both the pedalling station and the rowing station.

FIG. 4 shows the device in its operating position where the frame is set up such that the two rear wheels 13 are splayed outwardly for control and balance of the device. This formation of the frame is held by means of a movable brace 59. FIG. 5 of the drawings shows that the brace 59 can be collapsed allowing the frame to fold inwardly to a relatively collapsed position where the two rear wheels 13 lie parallel with one another for storage of the device.

Although various preferred embodiments of the present invention have been described in detail, it will be appreciated by those skilled in the art, that variations may be made without departing from the spirit of the invention or the scope of the appended claims.

The embodiments of the invention in which an exclusive property or privilege is claimed are defined as follows:

1. A combination exercise and land travel device, said device comprising a forwardly facing pedalling station from which a first operator propels the device and steering and braking means positioned to be controlled from said pedalling station and a rowing station usable by a second operator to provide propulsion for said device in addition to that provided at said pedalling station wherein said pedalling station includes a first operator seat and wherein said rowing station includes a second operator seat said first and second seats being to opposite sides and at opposite ends of said device, said first seat being higher than said second seat such that the first operator who is facing forwardly sits above and sees over the second operator who is facing rearwardly on said device.

2. A device as claimed in claim 1 having rear wheels which are mounted on a split rear axle comprising independent first and second axle parts, said first axle part being rotated by operation of said pedalling station, and said second axle part being operated by operation of said rowing station, said rowing station comprising a plurality of rowing components consisting of a pair of oars and a pair foot pedals, said components being connected through one way clutches to said second axle part such that said components are operable in different modes including independent modes where all of the components are usable independently of one another to rotate said second axle part and dependent modes where the components are usable in cooperation with one another to rotate said second axle part.

* * * * *